United States Patent Office 3,355,405
Patented Nov. 28, 1967

3,355,405
HEAT SEALING COMPOSITIONS CONTAINING PETROLEUM WAX AND A BLEND OF ETHYLENE POLYMERS
Leo W. Tyran, Lewiston, N.Y., assignor to E. I. du Pont de Nemours and Company, Wilmington, Del., a corporation of Delaware
No Drawing. Filed Oct. 14, 1966, Ser. No. 586,660
4 Claims. (Cl. 260—28.5)

ABSTRACT OF THE DISCLOSURE

This invention relates to heat-sealing compositions comprised of petroleum wax and a blend of ethylene polymers. By maintaining the proportions of the blend components within defined limits compositions which have high heat-sealing properties are provided.

*Cross-references to related applications*

This application is a continuation-in-part of U.S. application Ser. No. 258,949, filed Feb. 5, 1963.

*Background of the invention*

Petroleum waxes have been used in numerous coating materials for a great number of years. These waxes have been blended with various polymeric materials in an effort to obtain compositions having improved heat-sealing properties. For example, petroleum waxes have been blended with E/VA copolymers and for certain applications these polymer wax blends give desirable heat-sealing properties. Efforts have continued, however, to find adhesion-promoting additives which will increase the heat-sealing bond strength of adhesive compositions.

*Description of the invention*

It has been found that compositions having excellent heat-sealing properties are obtained by adding from 1 to 15% by weight of a blend of two different ethylene polymers to petroleum wax.

The blend of polymers is comprised of (A) from 1 to 40% by weight of a free-radical produced branched ethylene polymer containing at least 92% ethylene and up to 8% of a copolymerized ethylenically unsaturated monomer and having a melt index of 0.01 to 100 and (B) from 60 to 99% by weight of an ethylene polymer having a melt index of 0.1 to 500 and containing from 65 to 85% by weight of ethylene and 15 to 35% of a copolymerized monomer selected from the group consisting of ethyl acrylate and methyl methacrylate.

The ethylene polymer used as the adhesion-promoting additive must be a branched, high molecular weight polymer such as is produced at pressures of 50 to 3,000 atmospheres with a free-radical-forming catalyst such as a peroxide or azonitrile. Linear ethylene polymers of the type produced by use of coordination catalysts are not suitable for use in this invention, since instead of increasing the adhesion of the wax compositions, they actually cause a significant reduction in heat-seal bond strength. Processes which may be used for preparation of the ethylene polymers which are suitable in this invention are described in U.S. Patents 2,153,533, 2,200,429, 2,425,639 and 2,471,959. The polymer should contain at least 92% by weight of ethylene and may contain up to about 8% of a copolymerized ethylenically unsaturated monomer. Any ethylenically unsaturated monomer which copolymerizes with ethylene under free-radical polymerization conditions can be used. These include vinyl acetate and other vinyl esters, acrylic acid, methacrylic acid, maleic acid, fumaric acid, and esters of these acids with $C_1$ to $C_{12}$ alcohols, acrylonitrile, styrene, vinyl chloride, vinylidene chloride, vinyl fluoride, and vinylidene fluoride. Although ethylene polymers containing more than 8% vinyl acetate do not function as adhesion-promoting additives, a higher level of methacrylic acid, for example, 12% by weight can be present in effective, adhesion-promoting polymers. It is not necessary that the ethylene polymer contain any copolymerized ethylenically unsaturated monomer, indeed the homopolymer of ethylene, polyethylene, is a preferred species for use in this invention. For convenience, the term "polyethylene" will be used hereafter when referring to the adhesion-promoting additive; that is, the free-radical-produced, branched, high molecular weight polymer containing at least 92% ethylene. It is to be understood that statements regarding "polyethylene" apply equally to the ethylene homopolymer and the aforementioned ethylene polymers containing up to 8% of a comonomer. However, where reference is made specifically to the ethylene polymers containing up to 8% of a comonomer, the term "modified polyethylene" will be used for further clarity.

In order to be effective in this invention, the polyethylene must be a high molecular weight material. By this is meant that the polyethylene must have a melt index, as determined by ASTM test method D1238-57T, in the range of 0.01 to 100. Determination of the melt index is made using a temperature of 190° C. and a load of 2160 grams. The melt index is reported as the flow rate in grams per 10 minutes. The low molecular weight polyethylenes which are often used as wax additives and which have a melt index of greater than 1,000 totally are unsuitable for use in this invention since they actually cause a reduction in bond strength when incorporated into E/VA copolymer-wax compositions. Within the melt index range of 0.01 to 100, the highest molecular weight polyethylenes; that is, those with a melt index of 0.01 to 10, are effective at a level of 1 to 30%, preferably 5 to 20% in the blend of polymers to be mixed with the petroleum wax. The polyethylenes with a melt index of 10 to 100 can provide the same improvement in heat-seal bond strengths as the higher molecular weight materials, but must be used at the higher levels of 5 to 40%, preferably 10 to 30%, in the blend of ethylene polymers in order to obtain this improved performance.

It is surprising that polyethylene functions to improve the heat-sealing properties of petroleum wax compositions containing ethylene/ethyl acrylate or ethylene/methyl methacrylate copolymers, since these modified petroleum wax compositions exhibit much higher heat-seal bond strengths than do petroleum waxes containing only polyethylene as the modifier. The expected behavior would be to obtain a heat-seal bond strength intermediate between those obtained with polyethylene as the only modifier and with the other copolymers as the sole modifier. This is indeed the result obtained when linear polyethylene or very low molecular weight polethylene is used or when the amount of branched, high molecular weight polyethylene is outside the ranges heretofore defined.

The ethylene/ethyl acrylate and ethylene/methyl methacrylate copolymers suitable for use in this invention (referred to hereinafter, for brevity, as "copolymers") can be prepared by methods which are well known in the art. For example, the methods described in U.S. Patents 2,200,429 and 2,703,794 may be used. The copolymers are usually prepared for free-radical-catalyzed polymerizations like those which are required for the preparation of the polyethylene additive. The copolymers contain at least 65% ethylene and 15 to 35% of copolymerized ethyl acrylate or methyl methacrylate and have melt indices within the range of 0.1 to 500. The melt index is determined by ASTM Test Method B1238-57T using the conditions previously described for determination of the melt index of polyethylene.

The blend of polyethylene and copolymer of this invention can be prepared by mixing the ingredients in a Banbury mixer, on a two-roll mill, in a compounding extruder, or other such equipment. An especially convenient method is to add the polyethylene to the copolymer in the extruder which is commonly used in the last step in the manufacture of the copolymer to convert it to a physical form which is convenient to handle in subsequent operations; for example, incorporation into wax compositions.

As indicated previously, the polymer blend which is to be incorporated into the petroleum wax contains 1 to to 40% polyethylene and accordingly it contains 99 to 60% of the ethylene/ethyl acrylate or ethylene/methyl methacrylate copolymer. This polymer blend is combined with petroleum wax to give compositions containing 1 to 15% by weight of the polymer blend and 99 to 85% petroleum wax. The preferred range of polymer blend is 5 to 15%. At levels above 15%, the heat-seal bond strength is not improved by the presence of the polyethylene, although it is not deleteriously affected. The petroleum wax-polymer blend compositions of this invention can be readily prepared by adding the preformed blend to molten petroleum wax with agitation or the individual ingredients of the blend can be added to the molten petroleum wax.

The term petroleum wax as used herein refers to both paraffin and microcrystalline waxes. Paraffin wax, which is preferred for use in this invention, is a mixture of solid hydrocarbons derived from the overhead wax distillate fraction obtained from the fractional distillation of petroleum. After purification, the paraffin wax contains hydrocarbons that fall within the formulas $$C_{23}H_{48}\text{---}C_{35}H_{72}$$

It is a substantially colorless, hard and translucent material usually having a melting point of about 125–165° F. Microcrystalline wax is obtained from the nondistillable still residues from the fractional distillation of petroleum. It differs from paraffin wax in having branched hydrocarbons of higher molecular weights. It is considerably more plastic than paraffin wax and usually has a melting point of about 150–200° F.

This invention is further illustrated by the following examples in which all parts and percentages are on a weight basis. In the examples wherein a paper substrate was coated with a petroleum wax composition and the coated paper evaluated for heat-seal bond strength, the same procedure was followed in all the tests in order to assure comparable results. In these tests, for each run, a paraffin wax blend was prepared containing the indicated amounts of copolymer of this invention, and polyethylene, or modified polyethylene, by heating the components together with agitation at a temperature of about 250–300° F. In most cases, the copolymer and polyethylene were added separately, but in certain instances as will be indicated hereinafter, a preformed blend of these two polymers was used. Unless indicated otherwise, the paraffin wax used in all these tests was a commercially available material having a melting range of 143–150° F. The molten paraffin wax composition at a temperature of 195–225° F. was then applied to both sides of a bread wrap paper on a Talboys T-Line laboratory coater, Model 1500C. The paper was a 25 lb./ream clay-coated (one side) sulfite stock. The coatings were applied at a web speed of 30 ft./min. and after coating, the paper was immediately quenched in water at 70° F. or below. The coating weights were maintained within the range of 13.5 to 16.0 lb./ream. Other studies have shown that differences in coating weights between these limits have no effect on the heat-seal performance of the coated paper.

Heat-seal bond strengths were determined by TAPPI Suggested Method T642SM–54, modified in that paper to paper seals were made between the pigmented sides of the two strips of paper coated as above instead of between the unpigmented sides as suggested by the TAPPI procedure. This modified procedure is more sensitive to small changes in heat-seal strength than the TAPPI method. The paper to paper seals were mode on a Palo Myers sealer. The seal strengths were measured on an Instron Tensile Tester and the values reported represent the average of at least 5 and up to 9 measurements of the force in grams required to separate sealed strips of paper one inch wide.

By following this over-all procedure for coating, sealing and testing the coated paper samples, it is possible to achieve day-to-day reproducibility of ±5%, with standard deviations of less than 10% from the average value.

EXAMPLE I

This example illustrates the improvement in heat-sealing properties obtained by adding a controlled amount of a free-radical-produced, branched chain polyethylene to a blend consisting of wax and an ethylene copolymer.

A heat-sealable adhesive composition was prepared by blending 65 grams of an ethylene/ethyl acrylate copolymer containing 27% by weight of ethyl acrylate and having a melt index of 18 with 5 grams of free-radical-produced, branched polyethylene having a melt index of 4.1 and mixing the polymer blend with 630 grams of petroleum wax ("Aristowax" 143–150). A control composition containing 10% by weight of the ethylene/ethyl acrylate copolymer, was prepared for comparative purposes.

The compositions were separately applied to paper and their heat-seal bond strengths determined by the procedures previously described.

It was found that the addition of the polyethylene markedly increased the heat-seal bond strength giving a strength of 205 grams per inch, whereas the control composition gave only a strength of 165 grams per inch.

EXAMPLE II

Example I is repeated except that a copolymer of ethylene and methyl methacrylate having substantially the same physical properties as the ethylene/ethyl acrylate copolymer is substituted in like amount for the ethylene/ethyl acrylate copolymer. A control sample is prepared omitting the polyethylene. When coated onto paper and the heat-seal strengths are determined, it is found that the seal strength of the polyethylene containing adhesive greatly exceeds that of the control.

EXAMPLE III

A heat-sealable adhesive composition was prepared by blending 61 grams of ethylene/methyl methacrylate/methacrylic acid terpolymer (comonomer in the ratio 74.4/24.2/1.4 percent by weight) having a melt index of 2.1 with 9 grams of free-radical-produced, branched polyethylene having a melt index of 4.1 and thereafter blending the polymer mixture with 630 grams of petroleum wax ("Aristowax" 143–150). A control sample was prepared from which the polyethylene was omitted. The control sample contained 10% by weight of the terpolymer. Papers were coated with the compositions, and the heat-seal strengths determined as in Example I. The control sample had a strength of only 67 grams per inch whereas the sample containing the polyethylene had a strength of 125 grams per inch.

EXAMPLE IV

Example I is repeated with similar results when a free-radical-produced, branched chain modified polyethylene containing 3.4 percent by weight of vinyl acetate and having a melt index of 2.58 is substituted for the polyethylene. Similar results are likewise obtained when the vinyl acetate content of the modified polyethylene is increased to 8 percent by weight.

I claim:
1. A heat-sealable adhesive composition comprising, by weight, (1) 99 to 85% of a petroleum wax and (2) 1 to 15% of a blend of ethylene polymers, said blend comprising (A) 99 to 60% of an ethylene copolymer containing 65 to 85% ethylene and 15 to 35% of a monomer selected from the group consisting of ethyl acrylate and methyl methacrylate and having a melt index of 0.1 to 500; and (B) 1 to 40% of a free radical-produced, branched ethylene polymer containing at least 92% ethylene and up to 8% of a copolymerized ethylenically unsaturated monomer and having a melt index of 0.01 to 100.
2. The composition of claim 1 wherein said wax is paraffin wax.
3. The composition of claim 2 wherein said branched ethylene polymer is polyethylene having a melt index of 0.01 to 10 and is present in said blend of ethylene polymers in an amount from 1 to 30% by weight.
4. The composition of claim 2 wherein said branched ethylene polymer is polyethylene having a melt index from 10 to 100 and is present in said blend of ethylene polymers in an amount from 5 to 40% by weight.

References Cited
UNITED STATES PATENTS

| | | | |
|---|---|---|---|
| 2,953,541 | 9/1960 | Pecha et al. | 260—897 |
| 3,146,214 | 8/1964 | Jakaitis et al. | 260—28.5 |
| 3,155,631 | 11/1964 | Zapp | 260—28.5 |
| 3,205,186 | 9/1965 | Zaayenga | 260—28.5 |
| 3,215,657 | 11/1965 | Beresniewicz et al. | 260—28.5 |
| 3,275,494 | 9/1966 | Brunson et al. | 260—897 |
| 3,280,064 | 10/1966 | Hammer et al. | 260—28.5 |

MORRIS LIEBMAN, *Primary Examiner.*

B. A. AMERNICK, *Assistant Examiner.*